United States Patent [19]

Miller

[11] 3,834,000

[45] Sept. 10, 1974

[54] METHOD OF MANUFACTURING A MULTI-WEBBED EXPANDED STEEL PANEL

[75] Inventor: George D. Miller, Middletown, Ohio

[73] Assignee: Armco Steel Corporation, Middletown, Ohio

[22] Filed: Oct. 20, 1972

[21] Appl. No.: 299,281

[52] U.S. Cl............ 29/411, 29/157.3 V, 29/455, 29/470.9
[51] Int. Cl............................................. B23p 17/00
[58] Field of Search.... 29/155 R, 157.3 V, 455 LM, 29/470.9, 411

[56] References Cited
UNITED STATES PATENTS

| | | | |
|---|---|---|---|
| 2,996,792 | 8/1961 | Mackie | 29/157.3 V |
| 3,000,088 | 9/1961 | Melzer | 29/157.3 V UX |
| 3,067,492 | 12/1962 | Johnson | 29/455 LM UX |
| 3,111,747 | 11/1963 | Johnson | 29/155 R UX |
| 3,449,819 | 6/1969 | Blank | 29/470.9 |
| 3,466,726 | 9/1969 | Savolainen | 29/470.9 X |

Primary Examiner—Charlie T. Moon
Attorney, Agent, or Firm—John W. Melville; Albert E. Strasser; Stanley H. Foster

[57] ABSTRACT

This application discloses a method of making a multi-webbed steel panel. It discloses the preparation of a starting sandwich comprising top and bottom plates and a plurality of web bars therebetween. The web bars are coated on both sides with a weld-stop material except for stripes along opposite edges on opposite sides thereof. The assembled sandwich is fixed in position by means of edge bars and end bars, all of which are welded to the top and bottom plates to completely enclose the sandwich and to prevent shifting during rolling. This sandwich is then hot rolled in a series of passes to produce a reduction of at least 25:1 and even up to 75:1 to produce a long length of strip which is then sheared to length and the panel opened up by conventional means. Details of the stop-weld material and the manner of applying it are disclosed as well as rolling considerations involved.

10 Claims, 6 Drawing Figures

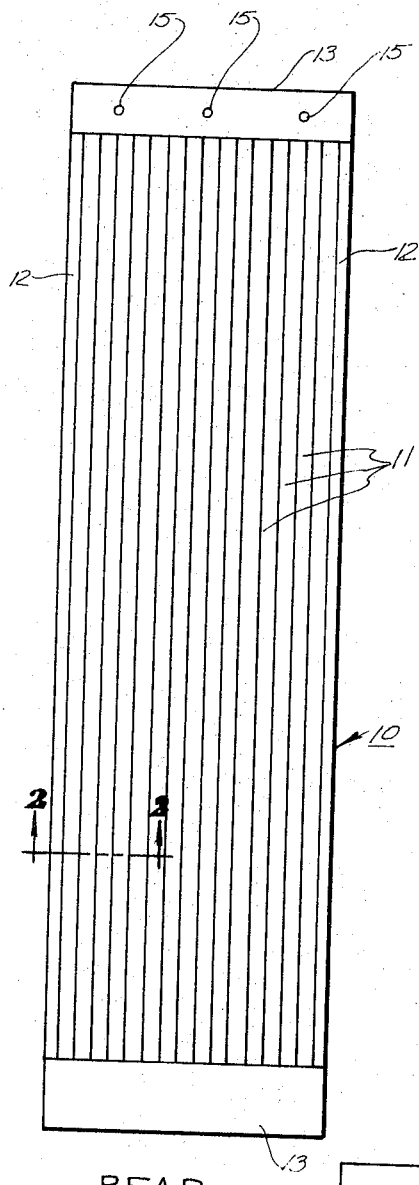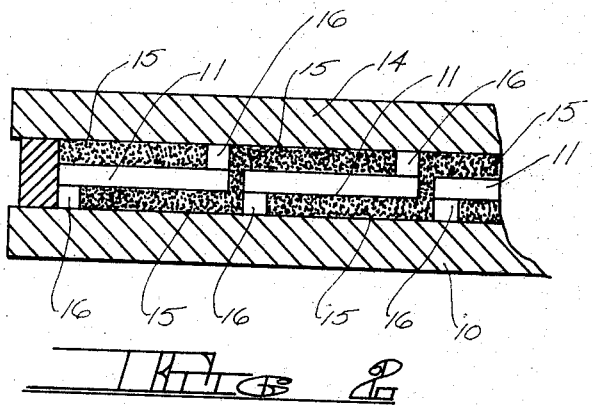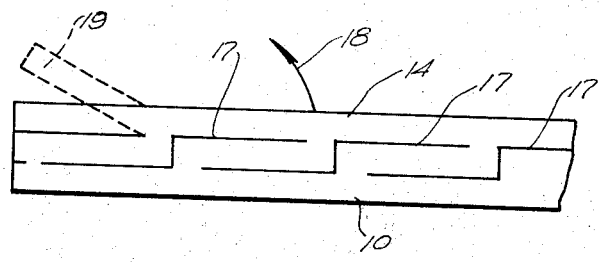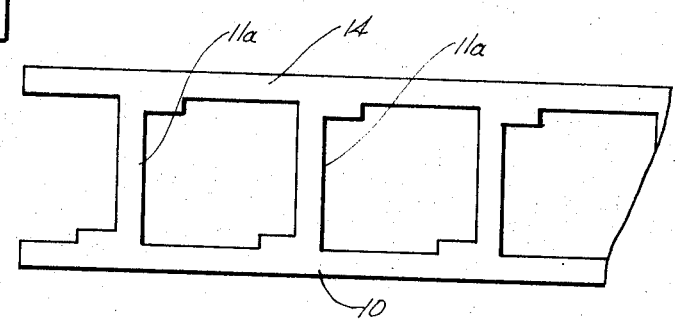

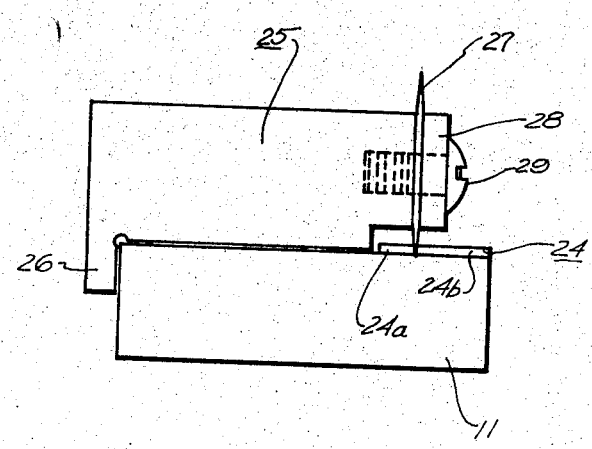
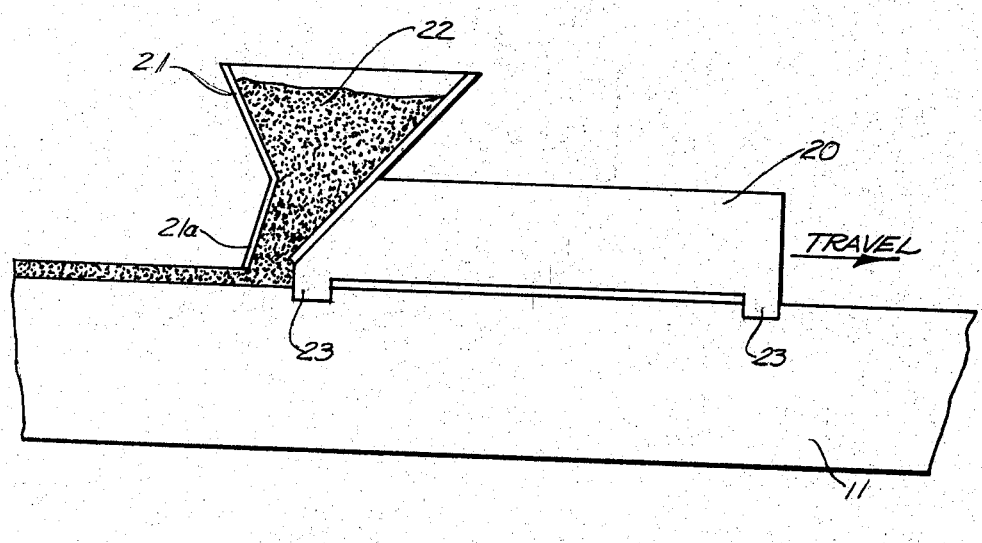

METHOD OF MANUFACTURING A MULTI-WEBBED EXPANDED STEEL PANEL

BACKGROUND OF THE INVENTION

The production of honeycomb panels particularly of aluminum is known. The honeycomb itself is usually produced by a hot roll bonding process and then expanded and brazed or adhesively bonded to the top and bottom plates. Sections may also be built up by welding individual joints such as box beams and plate girders together. It is aso known to make refrigerator freezer shelves by a hot roll bonding process followed by pneumatic or hydraulic expansion to form tubing, but these process are not intended to produce a structural section.

Little has been done in the field of producing steel multi-webbed panels by a hot roll bonding process. For one thing, the reductions which have been used in the past have been on the order of 3:1 and the expense of producing such panels has been entirely out of proportion to the value of the panels as completed.

Furthermore, the stop-weld materials used with aluminum have been found unsatisfactory for use with steel and it was necessary to determine upon a suitable stop-weld material which would not oxidze readily at steel rolling temperatures nor produce undesirable carburization effects and which would also be relatively inexpensive.

In order to make the production of multi-webbed steel panels practical, it is necessary to make them with a very heavy reduction so that a relatively small starting ingot or sandwich may produce a long length of strip which may then be sheared into numerous panels prior to expansion.

BRIEF DESCRIPTION OF THE FIGURES OF THE DRAWINGS

FIG. 1 is a plan view of a sandwich prior to addition of the top plate showing the relationship of the various parts.

FIG. 2 is a fragmentary cross sectional view taken on the line 2—2 of FIG. 1 on a grossly exaggerated scale showing the relationship of the elemnts. The stop-weld coating thickness has been greatly exaggerated.

FIG. 3 is a view similar to FIG. 2 showing the sandwich after rolling.

FIG. 4 is a view similar to FIG. 3 showing the sandwich opened up to form the multi-webbed panel.

FIG. 5 is an elevational view with parts in section showing a coating arrangement for applying the stop-weld material.

FIG. 6 is an end elevational view showing a method of masking the portion of the web bar which is not to be coated with the stop-weld material.

DETAILED DESCRIPTION

By reference to FIG. 1, the sandwich is made up of top and bottom plates, the bottom plate being indicated generally at 10. A suitable number of web bars 11 are disposed side-by-side in abutting relationship longitudinally of the plate 10 and along each edge there is provided an edge bar 12. At each end, there is provided an end bar 13. A top plate 14 is then placed on top of the sandwich. The web bars 11 are coated with stop-weld material as will be described hereinafter. The top and bottom plates should overhang the sandwich at both side edges and at both ends by a small amount, say a quarter inch to a half inch. The number and width of the web bars will be determined by the number of webs it is desired to have in the completed panel and the height of the webs. The web height is determined by the width of the stop-weld coated surface, as will be described hereinafter.

The edge bars 12 are uncoated and likewise the end bars 13 are uncoated. Preferably the end bar 13 on the front end of the sandwich (the upper end in the Figure) is plug-welded to the bottom plate, i.e., a plurality of holes 15 are burned in the plate 13 and the plate 13 is then welded to the bottom plate through the holes which are then filled with weld metal and ground smooth. The edge bars 12 and the tail end bar are tack-welded to the bottom plate. The top plate 14 is then placed in position and preferably guided into place by locating bars set into a guide frame around the edges so that the top plate does not in any way slide across the coated bars since this would disturb the stop-weld material.

Since the top and bottom plates protrude beyond the bar assembly, the edge and end bars may then be fillet welded to the top and bottom plates. The top plates at the front end may preferably be plug welded as described above to the front end plate 13. In welding across the rear end plate to the top plate, several short spaces (about 1 inch each) are not welded to permit expulsion of trapped gases during heating and rolling.

It may be desirable before the top plate is set in place to sprinkle the bar assembly with approximately one pint of light mineral oil or glycerol to provide a reducing atmosphere within the pack during heating.

As a typical example of dimensions and without in any sense constituting a limitation upon the invention, the top and bottom plates might, for example, be 180 inches in length by 49 inches in width by 2 ¾ inch thick. With web bars 3 inches in width by ¾ inch thick and 155 1/4 inch long, 15 web bars may be placed side-by side in abutting relation and then edge bars 1¾ inch wide by ¾ inch thick by 155 1/4 inch long may be disposed at each side. End bars may be 12 inches by 49 inches by ¾ inch, and with this arrangement the top and bottom plates will overhang the sandwich by three-eighths inch at each end and they will overhang by about a half inch on each side edge. The total sandwich thickness will be about 6 ¼ inches. Three or four 1 inch spaces may be left unwelded between the tail end bar and top plate for escape of gases.

The solid edges produced by bonding the uncoated edge bars to the cover plates helps to inhibit excessive spreading of the edge web during rolling. The bonding of the front and tail sections, i.e., the end bars to the cover plates is very necessary during rolling because laminated strip will tend to split open on the ends causing cobbles on the front end and excessive scrap loss at the tail end. The initial end bar size must be wide enough to allow for front and tail cropping prior to the finishing mill.

In FIG. 2, a fragmentary cross sectional view of the sandwich is shown in which the thickness of the stop-weld material is greatly exaggerated. The areas indicated with Z-shaped at 15 represent the stop-weld coating. It will be observed that each web bar 11 is coated along both edges and is coated over its major portions top and bottom, leaving uncoated areas 16 along opposite edges on opposite sides.

When the sandwich is hot rolled, as will be described in more detail hereinafter, the sandwich in cross section would have the appearance of FIG. 3 wherein the Z-shaped lines 17 indicate the stop-weld material.

When the sandwich is finally opened by a movement in the direction of the arrow 8 of FIG. 3, the resultant panel in cross section will have the appearance shown in FIG. 4. It will be clear that in oder to achieve perfectly flat panels, the webs resulting from the web bars 11 and which are indicated at 11a in FIG. 4 must be of exactly the same height. In order to achieve this, it is very important that the application of the stop-weld material be done with extreme accuracy as will be described hereinafter. The opening of the sandwich to the condition of FIG. 4 may be accomplished by prying up, as indicated by the broken lines at 19 in FIG. 3, the end portions of the top and bottom plates respectively and exerting a pulling apart action on them. It may also be accomplished by means of vacuum cups and the like.

THE STOP-WELD MATERIAL

Since the essence of the present invention is to achieve economical production of panels by making the original assembly from quite thick sections, followed by rolling reductions of at least 25:1 and even up to 75:1 (as opposed to the 3:1 reductions heretofore in general practice) thereby reducing the cost of assembly per finished panel, it follows that the stop-weld material must be capable of withstanding these large reductions without breakdown. It is necessary that the material be easily applied, capable of withstanding mechanical handling, and relatively inexpensive. There are a number of materials which will serve the purpose for small reductions, but only four have been found suitable for large reductions. These are flake graphite, molybdenum disulfide, chromic oxide and alumina. However, both graphite and molybdenum sulfide oxidize readily at steel rolling temperatures and graphite may also produce undesirable carburization effects. Chromic oxide, while not subject to these objections, is quite expensive and not as effective as alumina.

The stop-weld material is preferably about 50 to 60 percent by weight of alumina in pre-hydrolized ethyl silicate. This material is available on the market under the mark "Silbond" manufactured by Stauffer Chemical Co. The ethyl silicate vehicle provides advantages in rapid drying, good film strength, absence of evolution of fumes on heating, and it also deposits amorphous silica on drying which assists in the separation since silica itself is somewhat effective as a separator. Other vehicles such as shellac and varnishes can be used successfully but they have the disadvantages of longer drying time and the evolution of carbonaceous fumes on heating for rolling.

The particle size of alumina may be from about one micron to about 150 microns without appreciable effect on separating efficiency, since the larger particles break down under rolling pressure. Larger particles cause difficulty, however, in obtaining a uniform coating. It should be noted that large particles, say, 100 to 150 microns are not suitable if used alone because they pack poorly and it is difficult to achieve a suspension of them in a vehicle. A mixture of particle sizes is preferable and particles up to 150 microns are acceptable but the average particle size should not be over about 50 microns.

Effective separation for opening the panel may be obtained at reduction ratios up to about 50:1 with a separator coating thickness of about 20 mils, while at reduction ratios up to about 75:1 the separator coating should be about 30 mils thick. It has been found that with reductions greater than about 30:1, some additional working, as by roller leveling, is desirable in order to obtain effective separation.

The coating must be applied with great uniformity in thickness and must contain no foreign matter, bubbles, or other defects which appreciably affect the coating thickness because a small defect in the coating is magnified by the rolling ratio. It is difficult to apply the coating to meet these criteria by brushing, rolling, or spraying, and it would require several coatings to build up the required thickness. According to the present invention, the coating is applied as shown in FIG. 5. A web bar is indicated at 11. There is provided a small block 20 which is of the same width as the bar to be coated, which has a hopper 21 mounted thereon. One side of the hopper at 21a constitutes a screed blade which is preset to the desired coating thickness above the bar. The separator mixture 22 is fed into the hopper 21 from a separate container. This may, of course, be done automatically with automatic cut-off mechanism, etc. Rubber wiper blades, not shown, are provided on the sides of the hopper to prevent the stop-weld material from dribbling down the sides of the bar. The block 20 is provided with the guide elements 23 which maintain the relationship of the hopper with the side edge of the web bar. A separate applicator of similar construction is provided for coating the edges of the bars and a separate applicator is provided for each size bar to be coated.

As mentioned hereinabove, it is necessary in order to achieve flat panels that all the webs be of the same height and since the web height is determined by the width of the coated surface, it is important to insure an accurate coating width. This may be accomplished by the use of ordinary painter's masking tape, as indicated at 24 in FIG. 6. Tape of a width somewhat wider than the area which is to be bonded is laid along the one edge of the bar 11 and is then cut accurately to width by means of the device indicated generally at 25. This comprises a block having a locating surface 26 to guide it along the edge fo the web bar, and a razor blade 27 is clamped thereto by means of clamp 28 and screw 29. The device 25 is simply run along the length of the web bar, slitting the masking tape very accurately. The portion 24a of the tape is then stripped off before cating. After coating is completed, the portion 24b is stripped off. It will be understood from a consideration of FIG. 2 that if the upper right-hand edge of the web bar is masked, then the lower left-hand edge of the lower surface will be similarly masked so as to produce the result shown in FIGS. 2 and 3. In other words, the portion of the bar 11 on the top surface to the left of the razor blade cut will be coated and will not bond. The portion to the right of the razor blade after removal of the tape 24b will be uncoated and will bond during rolling. The same effect will be produced on the underside of the bar but along the opposite edge.

Alternatively, a steel tape of the same thickness as the separator may be used for masking and may be left in place during the rolling operation in order to provide for a sharper demarcation line between bonded and unbonded surfaces. Since steel tape is made to precise widths and cannot be deformed during application, cutting of the tape is unnecessary.

THE ROLLING PROCEDURE

The sandwich prepared as above described should be heated to a temperature preferably between 2,300° and 2,400° F., with the top and bottom as nearly as possible at the same temperature. Rolling is carried out on a standard hot strip mill. The first reduction should be preferably between 15 and 20 percent to ensure bonding and the first pass, and no edge rolling should be done until after the first surface rolling pass. Edge rolling before bonding has been established tends to buckle the pack transversely and it has been found that on clean surfaces, bonding requires approximately a 15 percent reduction at 2,300° F. The finishing temperature should preferably be near 1,400° F. The low temperature results in a sharper bend radius in the web of the finished panel which increases the panel strength slightly and permits a more predictable web height. The same effect may be obtained by small amounts of cold work such as temper rolling. The reason the top and bottom should be at nearly the same temperature is that temperature differences result in greater reductions in the hotter plate and this tends to develop a wave ahead of the roll which in turn puts excessive loading on the edge welds and tends to create a vacuum in the pack, which insufflates oxygen and inhibits bonding.

The resultant strip in the condition of FIG. 3 should not be coilded because the coiling and uncoiling operations result in undesirable buckles and corrugations which would usually not be tolerable in the finished panel.

The exemplary sandwich described above which has a length of 15 feet, will produce about 500 feet of strip material. This strip material is sheared to length and then roller leveled (or temper rolled and roller leveled) and opened, for example by a combination of vacuum cups and a modified stretcher leveler. The pieces are then pickled and may then be given a protective coating by any of the known processes. Preferably, pickling should be carried on after the panel is opened to allow thorough rinsing of the interior. Pickling after hot rolling before opening results in seepage of acid into the interior, producing an undesirable attack on the inner surfaces which cannot be effectively rinsed.

From the foregoing description, it will be seen that the sandwich of FIGS. 1 and 2, which is comparable to usual slab dimensions, results in a long strip from which many panels are produced so that the high assembly cost is distributed over a large number of products, resulting in economical production. While a reduction of the order described in the example herein will produce about 500 feed of finished panels, a 3:1 reduction would produce a little less than 45 feet of finished panels, which is a difference of one order of magnitude.

It should be observed that the final panel produced is designed into the original slab by proper selection of the web bar width and coated width and since the plates and webs undergo the same reduction during rolling, the thickness ratio of the plate to web is fixed by the selection of the original thickness. The rolling reduction determines the absolute thicknesses but the basic panel design is built into the original slab.

Numerous modifications may be made. For example, the thickness of the plates may be varied at will, depending on the starting thickness and reduction. The hot rolling may be followed by cold reduction if desired. So long as the top and bottom plates may be bonded to the web plates, the top and bottom plates may be different material. It is also possible to vary the width of the web plates in a suitable manner and produce a section which is tapered from one edge to the other or having a curved top plate and a straight bottom plate, or curved top and bottom plates. All such modifications are within the spirit of the invention and therefore no limitation which is not specifically set forth in the claims is intended or should be implied.

I claim:

1. The method of making a multi-webbed steel panel, which includes the steps of:
   a. preparing a plurality of steel web bars by
      1. accurately masking a stripe along one edge of the top surfaces of each, and coating the unmasked portions with a stop-weld material,
      2. accurately masking a stripe along the bottom surfaces of each, and coating the unmasked portion with a stop-weld material,
      3. coating both longitudinal edges of said web bars with a stop-weld material;
   b. assembling a sandwich comprising
      1. a steel bottom plate,
      2. a plurality of web bars in like oeientation and in laterally abutting relation, longitudinally of said plate,
      3. an uncoated steel edge bar along each edge of said bottom plate, abutting the outermost of said web bars,
      4. an uncoated steel end bar, abutting the ends of said web bars at each end of said plate,
      5. a top plate of the same size as said bottom plate,
      6. welding said end bars and edge bars to said top and bottom plates;
   c. heating said sandwich to a normal hot rolling temperature,
   d. hot rolling said heated sandwich in a first pass to produce a reduction of at least about 15 percent,
   e. thereafter carrying out further hot rolling passes to produce a reduction of at least 25:1,
   f. shearing the resultant strip to panel length, and
   g. opening the panel length by separating the outer layers of the hot rolled sandwich; whereby to produce a multi-webbed beam-panel having substantial structural strength.

2. The method of claim 1, wherein said stop-weld material is about 50 percent by weight alumina in prehydrolized ethyl silicate as a vehicle.

3. The method of claim 1, wherein said alumina has a particle size ranging between 1 micron and 150 microns.

4. The method of claim 1, wherein the thickness of said stop-weld coatings is from about 10 mils to about 30 mils.

5. The method of claim 1, wherein said sandwich, prior to rolling is about 15 feet long, and the hot rolling produces a reduction of from about 25:1 to about 75:1.

6. The method of claim 1, wherein the weld of the tail end bar to the top plate is interrupted to allow for expulsion of trapped gases during heating and rolling.

7. The method of claim 1, wherein the sheared pieces are roller-leveled prior to opening.

8. The method of claim 1, wherein the hot rolling steps are followed by a cold rolling pass.

9. The method of claim 1, wherein said masking is accomplished by means of masking tape which is removed after coating and before assembly of the sandwich.

10. The method of claim 1, wherein said masking is accomplished by means of a steel tape which is of the same thickness as the coating and left in place during assembly.

* * * * *